United States Patent
Betteridge et al.

(10) Patent No.: US 12,093,660 B2
(45) Date of Patent: *Sep. 17, 2024

(54) INTENT MATCHING ENGINE

(71) Applicant: Zoom Video Communications, Inc., San Jose, CA (US)

(72) Inventors: Justin Bryce Betteridge, Boise, ID (US); Connor Isaac Brinton, Holly Springs, NC (US); Samuel John Wenke, Cincinnati, OH (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,204

(22) Filed: Jun. 5, 2023

(65) Prior Publication Data

US 2024/0143946 A1    May 2, 2024

Related U.S. Application Data

(63) Continuation of application No. 17/978,098, filed on Oct. 31, 2022, now Pat. No. 11,710,002.

(51) Int. Cl.
| | | |
|---|---|---|
| *G06F 40/47* | (2020.01) | |
| *G06F 40/263* | (2020.01) | |
| *G06F 40/30* | (2020.01) | |
| *G06F 40/51* | (2020.01) | |

(52) U.S. Cl.
CPC ............ *G06F 40/47* (2020.01); *G06F 40/263* (2020.01); *G06F 40/30* (2020.01); *G06F 40/51* (2020.01)

(58) Field of Classification Search
CPC ........ G06F 40/47; G06F 40/263; G06F 40/30; G06F 40/51
USPC ............................................................ 704/2
See application file for complete search history.

(56) References Cited

U.S. PATENT DOCUMENTS

| | | | |
|---|---|---|---|
| 11,113,476 | B2 | 9/2021 | Seibel |
| 11,710,002 | B1 * | 7/2023 | Betteridge .............. G06F 40/47 704/2 |
| 2008/0052077 | A1 | 2/2008 | Bennett et al. |
| 2021/0133224 | A1 | 5/2021 | Tiwari et al. |

OTHER PUBLICATIONS

International Search Report and Written Opinion mailed on Dec. 15, 2023 in corresponding PCT Application No. PCT/US2023/034547.
Wikipedia, Word embedding, https://en.wikipedia.org/w/index.php?title=Word_embedding&oldid=1106009992, Aug. 22, 2022, 7 pages.
Published in Analytics Vidhya, Machine learning-based intent classification model, Shivansh Dave, Jun. 8, 2020, 7 pages.

* cited by examiner

*Primary Examiner* — Thierry L Pham
(74) *Attorney, Agent, or Firm* — Young Basile Hanlon & MacFarlane, P.C.

(57) ABSTRACT

A server accesses a natural language query. The server facilitates a mapping of the natural language query to a vector using a query-to-vector engine. The server matches the vector to an intent representing a prediction associated with the natural language query. The server provides a response to the natural language query based on the intent.

20 Claims, 10 Drawing Sheets

INTENT MATCHING ENGINE

FIELD

This disclosure relates to techniques for a multilingual intent matching engine, which may, for example, match a natural language query in one of multiple natural languages to an intent.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
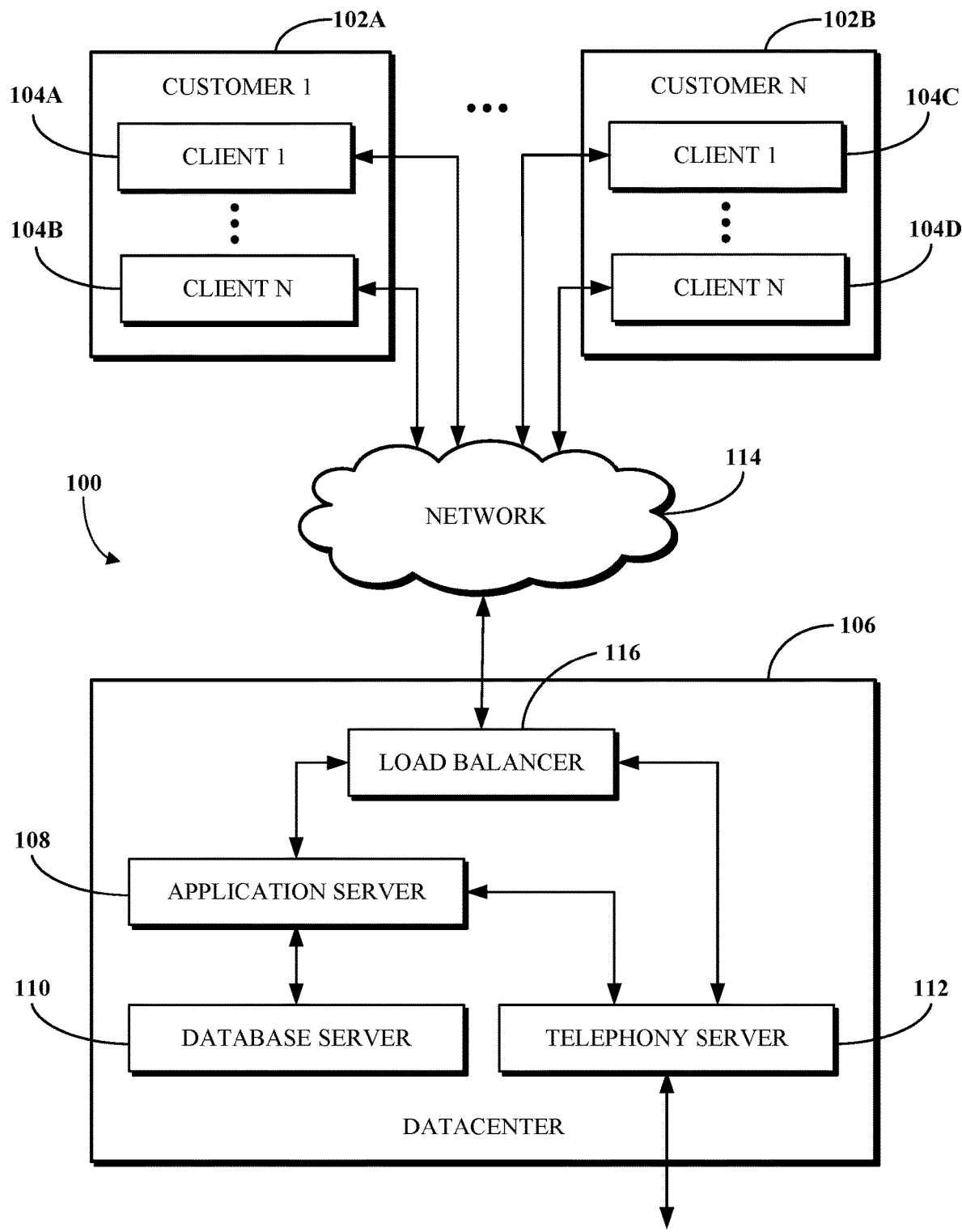
FIG. 1 is a block diagram of an example of an electronic computing and communications system.

A contact center may be operated by or otherwise on behalf of a business to assist users of various products and related services of the business. The contact center may be accessible to such users via multiple modalities, for example, telephone, text messaging, chat messaging, audio or video conferencing, social media, and/or email. For example, the contact center may be implemented via one or more software services of a Unified Communication as a Service (UCaaS) software platform. In recent years, many contact center systems have begun to use automated chat bots (e.g., computer-implemented engines configured to automatically evaluate input into a chat service) to process spoken or written natural language input provided by users (i.e., queries) to identify the users' goals and to provide appropriate responses.

In some cases, a natural language query, whether presented by a contact center user in the form of audio or text-based input, may be matched to an intent known to the contact center system. An intent is a representation of a goal of a user in interacting with a contact center. For example, an intent may include a classification of a group of queries that are to be processed using a similar technique. For example, one or both of the queries "I moved and have a new address" or "I have a new billing address" may be matched to the intent "change billing address." The intent to which the query is matched then corresponds to a workflow that is carried out by the contact center system. For example, the workflow for the intent "change billing address" may include asking the user to enter the new billing address, confirming that the new billing address is a valid address, and providing a confirmation to the user.

The above technique may be effective for users who communicate using a default natural language used by the menus, services, agents, and other system elements of the contact center (e.g., English). However, A user of a contact center may speak or type a natural language query for automatic processing by a server of the contact center, and so the natural language query may be in any natural language (e.g., English, Spanish, or Chinese) and may be formatted in any grammatically correct (or grammatically incorrect) manner. Techniques for automatically processing natural language queries in different natural languages so as to match such multilingual queries to a common intent may thus be desirable, for example, to allow people who speak different languages to use automated aspects of the contact center.

A naïve solution may include translating a given natural language query into a default natural language (e.g., English) of the contact center system if the natural language query is not originally spoken or typed in that default natural language, and then searching for content and/or assigning an intent based on the text (e.g., typed text or text obtained using speech-to-text technology) of the query now in the default natural language. However, such approaches require computing resources (e.g., processing power and bandwidth) to perform the translation, which in many cases can lead to significant latencies in delivering translated content. Furthermore, such approaches might lose useful context in the translation, for example, due to the use of idioms (e.g., "raining cats and dogs"), culturally understood emotionally charged language (e.g., "mother of God"), or other phrases that are difficult to map from one natural language onto another.

Implementations of this disclosure address problems such as these using multilingual intent matching, which begins with a server accessing (e.g., in response to a transmission to the server from a client device) a natural language query. The natural language query may be in one of multiple natural languages that the server is configured to handle. For example, the server may be configured to handle natural language queries in English, Spanish, French, German, Chinese, and Japanese.

The server maps the natural language query to a vector in a multi-dimensional space using a query-to-vector engine. The query-to-vector engine is configured to map natural language queries in the multiple natural languages to vectors corresponding to meanings of the natural language queries. For example, if the English phrase, "I want coffee," means the same thing as the Spanish phrase, "Yo quiero café," then both phrases would be mapped, by the query-to-vector engine, to the same vector. A phrase that means something different from "I want coffee" would map to a different vector. The query-to-vector engine leverages token embeddings for all tokens in a predefined vocabulary that spans the plurality of natural languages. Alternatively, the query-to-vector engine leverages word embeddings in each of the plurality of natural languages. Word embedding represents each word as a real-valued vector that encodes the meaning of the word, such that words that are closer in the vector space are expected to be more similar in meaning.

The server matches the vector to an intent. The intent represents a prediction (e.g., of a goal) associated with the natural language query. In some cases, the intent groups multiple queries into a common goal for further processing. An entity (e.g., a business) may have multiple intents associated with actions customers request from the business. For example, a bank may have the intents "open savings account," "close savings account," "deposit to savings account," "withdraw from savings account," "check savings account balance," "apply for a loan," "make a loan payment," and "check loan balance." According to some examples, the queries "What is the balance of my savings account," "How much money is in my savings account," and "Cuál es el saldo de mi cuenta de ahorros," ("What is the balance of my savings account" in Spanish) could all be matched to the intent "check savings account balance," which could then be processed by the server.

After matching the vector to the intent, the server processes the intent to generate a response to the natural language query. For example, in response to determining that the intent is "check savings account balance," the server may identify the user, obtain the user's savings account balance, and provide the balance in response to the natural language query via at least one of text, audio, an image, or a hyperlink.

In some cases, prompts presented to the user associated with the intent (e.g., the prompts associated with identifying the user) may be in a natural language corresponding to the natural language of the query. For example, if the query is in Spanish, the prompts presented to the user may also be in Spanish. Alternatively, the prompts may be presented in a default language (e.g., English) regardless of the language of the query.

As used herein, the term "intent" may include a member of a set of stored intents, where multiple natural language queries may match to the same intent. The intent may correspond to predicted data, for example, a predicted goal, of a user entering the natural language query. The predicted data may be associated with the natural language query. For example, a credit card company may have intents including: "change billing address," "dispute a charge," "request credit limit increase," and "request interest rate reduction," each of which could have multiple different corresponding natural language queries.

As used herein, the phrase "natural language" may include any spoken or written language that has developed and evolved naturally by human use thereof. Examples of natural languages include English, Spanish, French, German, Greek, Chinese, Japanese, and Korean.

To describe some implementations in greater detail, reference is first made to examples of hardware and software structures used to implement intent matching. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
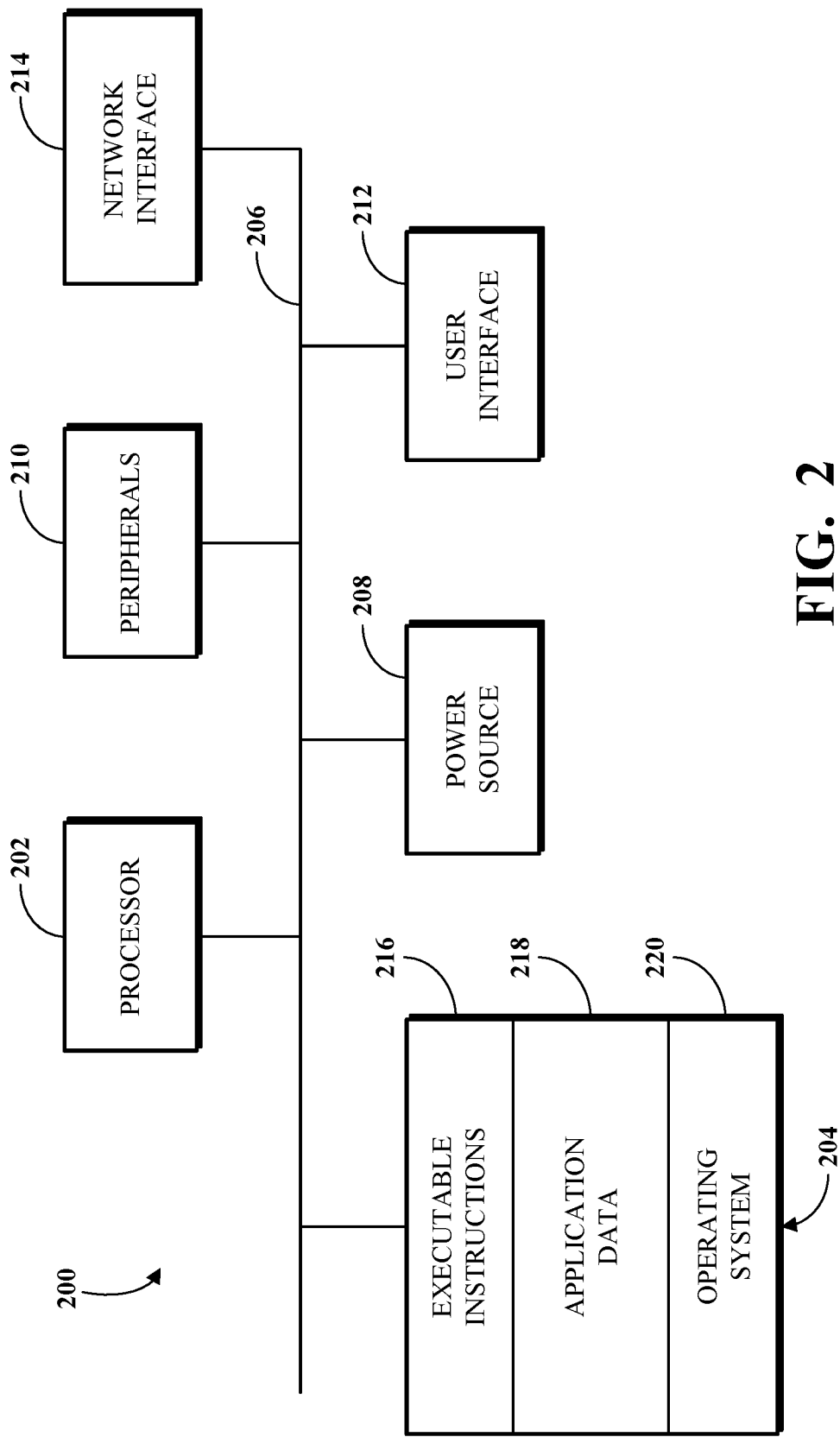
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
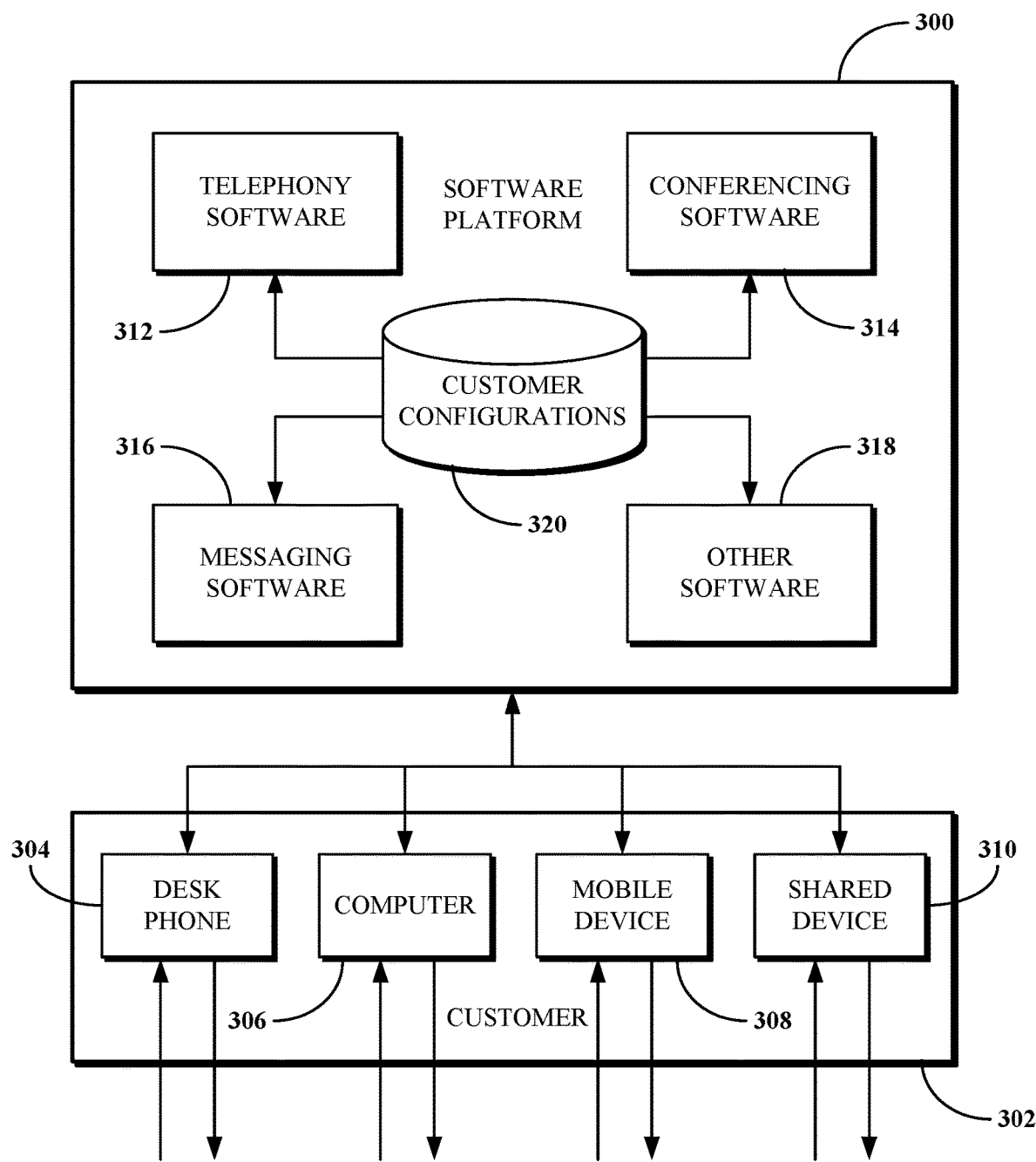
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software of an intent management engine and/or software for online learning by the intent management engine.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
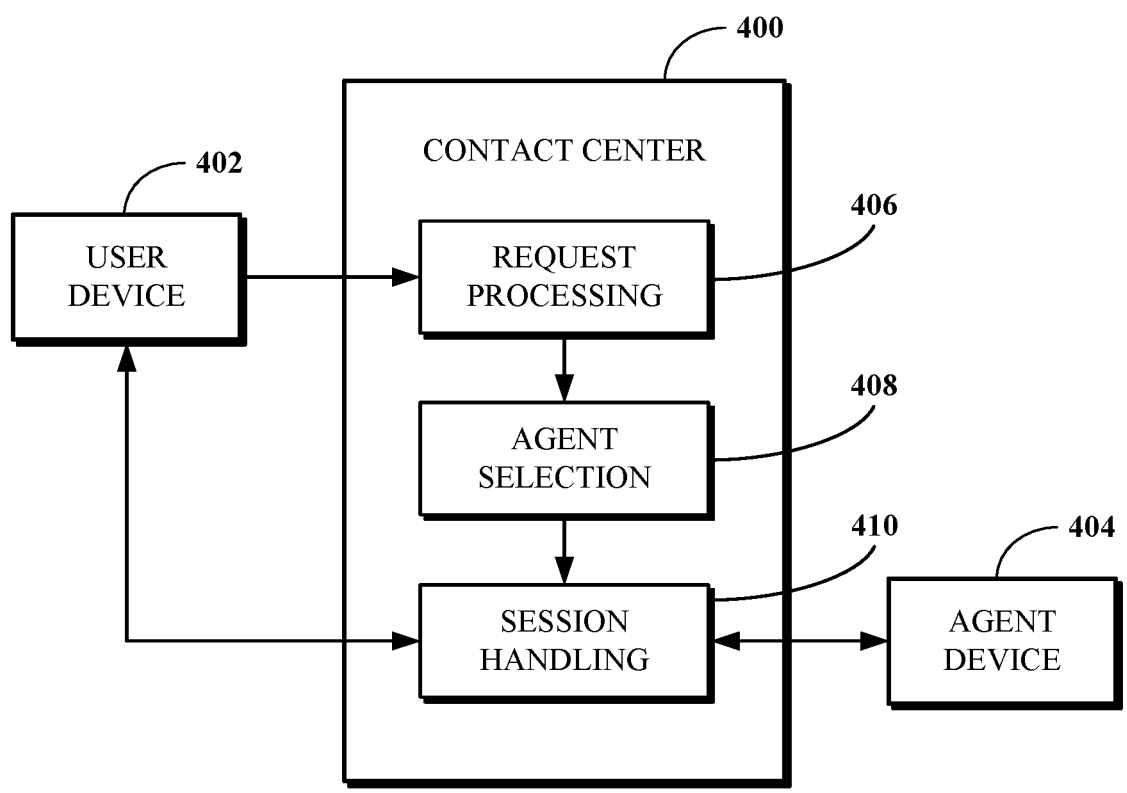
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400, for example, telephony, video, text messaging, chat, and social media. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The request may include a natural language query or a request entered in another manner (e.g., "press 1 to pay a bill, press 2 to request service"). The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request (e.g., the natural language query) via text and thereafter process the text entered by the user device 402 using natural language processing and/or other processing.

The session handling software 410 establishes a connection between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
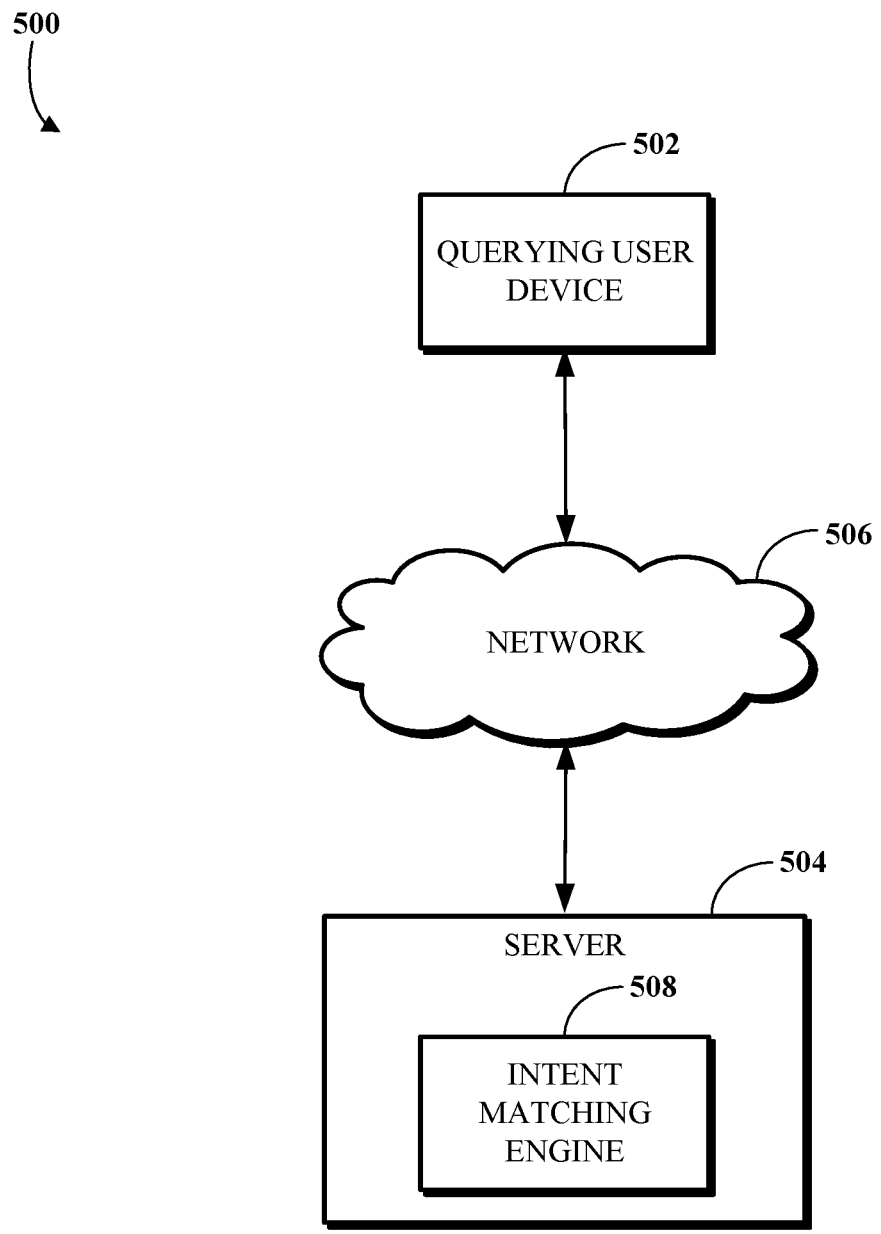
FIG. 5 is a block diagram of an example of a system for intent matching.

FIG. 5 is a block diagram of an example of a system 500 for intent matching. As shown, the system 500 includes a querying user device 502 and a server 504 capable of communicating over a network 506. The server 504 stores an intent matching engine 508 that matches an input natural language query to an intent. The intent matching engine 508 may be implemented using machine learning or other artificial intelligence technologies. In some examples, the intent matching engine 508 leverages a convolutional neural network (CNN) that is capable of online learning. (Using online learning, the CNN may be trained during its real world usage, based on intents suggested, by the CNN, for queries and whether or not the user accepted the intent. Alternatively, the CNN may be trained using ranked batch-mod active learning, and the results of the ranked batch-mode active learning may be used to choose which queries should be presented (e.g., to devices of employees of the contact center) for manual labeling.) Alternatively, any other type of artificial neural network (ANN) may be used. In some cases, the intent matching engine may be implemented using at least one of a classification model, a regression model, clustering, dimensionality reduction, or deep learning. More details of the operation of the intent matching engine are provided below. As used herein, an engine may include software, hardware, or a combination of software and hardware.

The querying user device 502 may correspond to the user device 402 and/or to one of the clients 104A-D. The server 504 may correspond to a server of the contact center 400 and/or to the application server 108.

According to some implementations, the querying user device 502 transmits a natural language query (i.e., a query in one of multiple natural languages, such as English, Spanish, French, German, Chinese, or Japanese) to the server 504 over the network 506. The natural language query may be spoken, typed, or otherwise inputted into the querying user device 502 in a natural language (e.g., of the multiple natural languages). The natural language query may include a question or a request provided to a chat bot, for example, "How do I cancel my subscription?" or "I would like to cancel my subscription."

In response to receipt of the query from the querying user device 502, the server 504 uses the intent matching engine 510 to match the query to an intent, and transmits, to the querying user device 502, an output associated with the intent. An intent may represent a goal or a purpose that a user of the querying user device is attempting to accomplish. For example, the query, "I would like to cancel my subscription," may match to the intent "cancel subscription."

Figure 6:
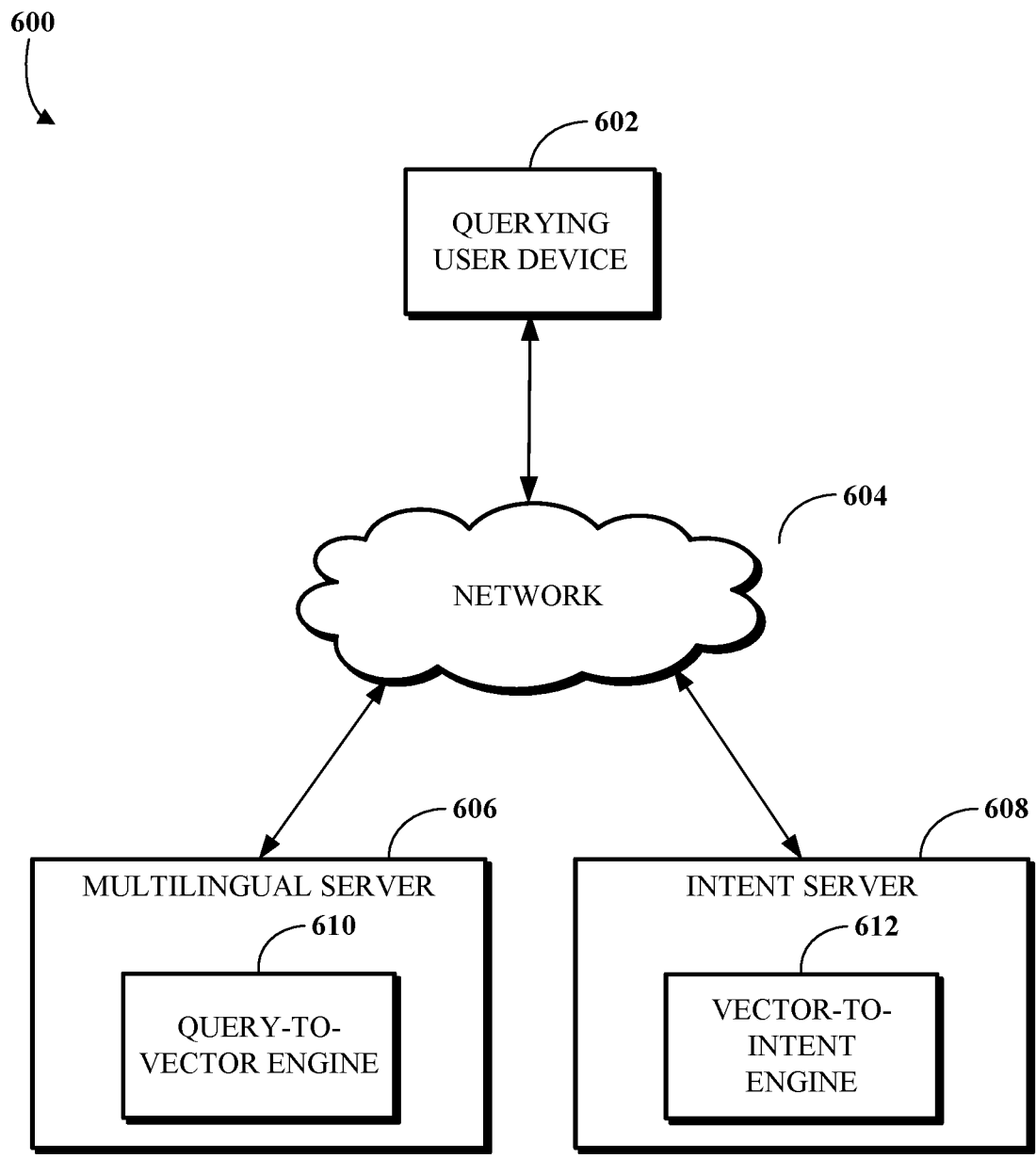
FIG. 6 is a block diagram of an example of a system for multilingual intent matching.

FIG. 6 is a block diagram of an example of a system 600 for multilingual intent matching. As shown, the system 600 includes a querying user device 602 connected to a network 604, and a multilingual server 606 and an intent server 608 also connected to the network 604. The querying user device 602 may, for example, be or otherwise correspond to the querying user device 502. The network 604 may, for example, be or otherwise correspond to the network 506. The multilingual server 606 and/or the intent server 608 may, for example, be or otherwise correspond to a server of the contact center 400 and/or to the application server 108. As shown, the multilingual server 606 includes a query-to-vector engine 610 and the intent server 608 includes a vector-to-intent engine 612.

As described below, the multilingual server 606 is responsible for multilingual processing and the intent server 608 is responsible for intent matching. The multilingual server 606 and the intent server 608 may be operated by different entities or by the same entity. For example, the intent server 608 may be a component of a contact center. The multilingual server 606 may also be a component of the contact center or, alternatively, may reside externally to the contact center.

The querying user device 602 transmits a query to the intent server 608. For example, the querying user device 602 may access or otherwise connect to (e.g., via a web application, client application, text message, or by telephone call) a contact center associated with the intent server. Upon accessing or otherwise connecting to the contact center, a user of the querying user device 602 may type or speak a query in response to a prompt presented by the contact center. For example, a user might call a telephone number of a bank and be presented with a prompt saying "How can we help you today?" The user may respond by saying, "¿Hay cajeros automáticos en San Francisco?" meaning "Are there automatic teller machines (ATMs) in San Francisco?" in Spanish.

The intent server 608 transmits this query to the multilingual server 606. Alternatively, the multilingual server 606 may receive the query directly from the querying user device 602. At the multilingual server 606, the query-to-vector engine 610 maps the query to a vector. To map the query to the vector, the query-to-vector engine 610 leverages word embeddings or token embeddings in multiple natural languages (e.g., English, Spanish, and Korean) or, alternatively, in a single vocabulary comprising words in all of the multiple natural languages (e.g., a single vocabulary comprising English words, Spanish words, and Korean words) to map queries in the natural languages to numeric vectors, where a vector for a given query corresponds to the meaning of the query. For example "Are there ATMs in San Francisco?" (English) and "¿Hay cajeros automáticos en San Francisco?" (Spanish) would correspond to the same vector because these phrases mean the same thing (i.e., these phrases have the same semantic or contextual meaning). A phrase with a different meaning, for example, "Does the bank have branches in Los Angeles?" would correspond to a different vector. A word embedding is a mapping of a given word to a numeric vector corresponding to the meaning of the word. As a result, two or more synonyms in the same language (e.g., "lawyer" and "attorney") would have the same numeric vector as their word embedding. Similarly, two or more words that mean the same thing in different languages (e.g., "lawyer" in English and "abogado" in Spanish) would also have the same numeric vector as their word embedding. However, words with different meanings (e.g., "lawyer" and "engineer," or "abogado" and "engineer") would have different numeric vectors as their word embeddings. The multilingual server 606 transmits the vector computed by the query-to-vector engine 606 to the intent server 608.

After receiving the computed vector, the intent server 608 uses the vector-to-intent engine 612 to match the vector to an intent that represents a prediction associated with the query. The intent may be selected from a predefined set of intents using an artificial intelligence engine that matches queries to intents. The predefined set of intents may include global intents for all operators of a contact center (e.g., all operators—including, for example, banks, online stores, and government agencies) may provide support for the intent "open account" and "change billing address") and specific intents for a specific operator (e.g., an airline may support a "change seat" intent, while a bank might not support such an intent). The intent may represent a predicted user goal that a user submitting the query is trying to accomplish, and multiple different queries may match to the same intent. For example, the query "Are there ATMs in San Francisco?" may match to the intent "locate ATM." It should be noted that many other queries, such as "Find ATM near me," "ATM near 123 Main Street," or "¿Dónde está el cajero automático?" ("Where is the ATM?" in Spanish) may all match to the intent "locate ATM."

After the vector is matched to the intent, the intent server 608 provides a response to the query based on the intent. The response may be, include, or otherwise correspond to a workflow for handling the intent. In particular, the workflow is, includes, or otherwise describes a set of operations or actions for processing the intent. A workflow may involve actions performed at a server (e.g., the intent server 608), at a user device (e.g., the querying user device 602), or both. For example, for the intent "locate ATM," the workflow may include transmitting, from the intent server 608 to the querying user device 602, a message requesting the location near which an ATM is to be found; receiving, at the intent server 608 from the querying user device 602, a response indicating the location; searching a data repository for an ATM location closest to the indicated location; and transmitting, from the intent server 608 to the querying user device 602, a message indicating the street address of the ATM location. This workflow may be performed in a default language (e.g., English) or in the language of the query provided by the querying user device 602. In some cases, one or more actions of a workflow may be omitted or otherwise ignored where the original query includes information that would satisfy the one or more actions. For example, referring to the workflow described above, the steps of transmitting, from the intent server 608 to the querying user device 602, a message requesting the location near which an ATM is to be found, and receiving, at the intent server 608 from the querying user device 602, a response indicating the location, may be skipped if the location (e.g., San Francisco in "Are there ATMs in San Francisco?") is indicated in the original query.

In some implementations, the query-to-vector engine 610 and/or the vector-to-intent engine 612 are implemented using artificial intelligence techniques, such as an ANN, a CNN, or a deep neural network. The vector-to-intent engine 612 may be trained by locking the word embeddings of the query-to-vector engine 610 (so the word embeddings are not updated, for example, via stochastic gradient descent (SGD) or online learning (during typical operation of the query-to-vector engine word embeddings may be updated in real time using SGD or online learning, for example, if the query-to-vector engine is being used for translation or machine-based communication, user feedback may be solicited regarding whether the translation or the machine-based communication is accurate, and the query-to-vector engine may be trained based on the user feedback)) and using supervised learning. The supervised learning is accomplished using a training dataset that includes a set of queries, with each query being associated with an intent correctly matched thereto. Alternatively, a query may be matched to zero or more intents, as some queries may not match to any intents, and some queries may match to multiple intents, and these cases are relevant for training in accordance with supervised learning. Queries in the set may be matched to intents by one or multiple human operators. Alternatively, other artificial intelligence training techniques, such as those which involve unsupervised learning, semi-supervised learning, or reinforcement learning, may be used.

In some implementations, the query-to-vector engine 610 and the vector-to-intent engine 612 are tested together by verifying that a first query in a first natural language and a translation of the first query into a second natural language match to the same intent. For example, the query-to-vector engine 610 and the vector-to-intent engine 612 may be tested together by verifying that the queries "Are there ATMs in San Francisco?" and "¿Hay cajeros automáticos en San Francisco?" match to the same intent (e.g., "locate ATM"). Similarly, other queries that mean the same thing in different natural languages (e.g., "I want coffee" in English and "Yo quiero café" in Spanish) should match to the same intent (e.g., "order food/drink").

The implementation shown in FIG. 6 has some differences with the implementation shown in FIG. 5, for example, to facilitate multilingual query processing. Specifically, the server 504 is replaced with two servers—the multilingual server 606 and the intent server 608—and the intent matching engine 508 is replaced with two engines—the query-to-vector engine 610 and the vector-to-intent engine 612. As described above, the process of matching a query to an intent is separated into mapping a query to a vector and then matching the vector to an intent. The vector thus represents the meaning of the query.

Figure 7:
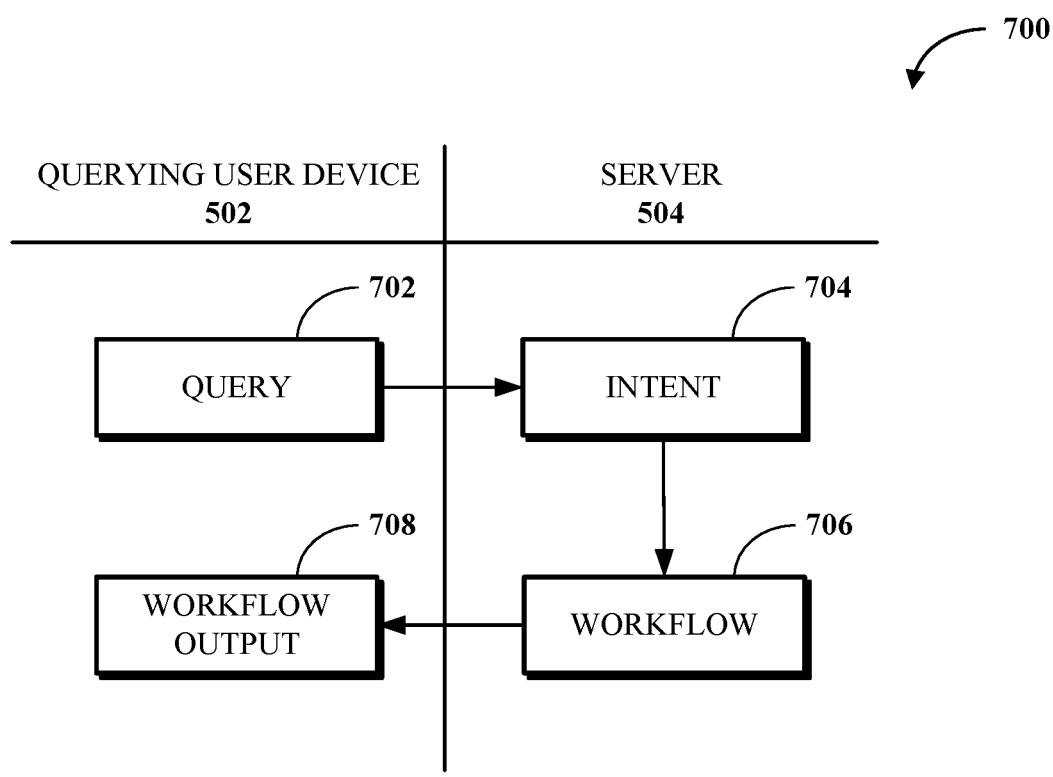
FIG. 7 is a data flow diagram of an example of intent matching and workflow processing.

FIG. 7 is a data flow diagram of an example of intent matching and workflow processing 700. As shown, the intent matching and workflow processing 700 is implemented using the querying user device 502 and the server 504 described in conjunction with FIG. 5. An alternative implementation may leverage the querying user device 602 in place of the querying user device 502, and the intent server 608 (working in conjunction with the multilingual server 606) in place of the server 504.

As shown in FIG. 7, the querying user device 502 generates a query 702 in a natural language and transmits the query 702 to the server 504. The query 702 may be generated during a communication with a chat bot of the server 504 via a telephone call, a messaging application, a website, or a dedicated application of an entity associated with the chat bot. For example, a user might wish to open a savings account at a bank. To accomplish this, the user might telephone the bank and may be asked, by a chat bot, "Please state the reason for your call." In response, the user might say, "I want to open a new savings account," and that phrase may become the query.

The server 504 matches the query 702 to an intent 704 using the intent matching engine 508 shown in FIG. 5. The intent 704 may be identified by applying a CNN or other artificial intelligence software of the intent matching engine 508 to the query 702. For example, the query 702 "I want to open a new savings account," may match to the intent "open account." The server 504 identifies a workflow 706 corresponding to the intent 704. The workflow 706 may include, for example, a link to a webpage for opening new accounts with the bank or connection with a human representative who can assist the user of the querying user device 502 with opening the new account. In some cases, the workflow 706 may be performed by the chat bot of the server 504 directly. For example, to open the new account, the workflow 706 may include the chat bot verifying the user's identity (e.g., by having the user provide their social security number and answer security questions generated based on their credit report), verifying the type of account (e.g., savings account) that the user wishes to open, requesting the account number of another account from which the opening deposit is to be obtained, and initiating an automated clearing house (ACH) request for the opening deposit. The server 504 transmits a workflow output 708 associated with the workflow 706 (e.g., questions by the chat bot, the link to the webpage, or the connection with the human representative) to the querying user device 502.

Figure 8:
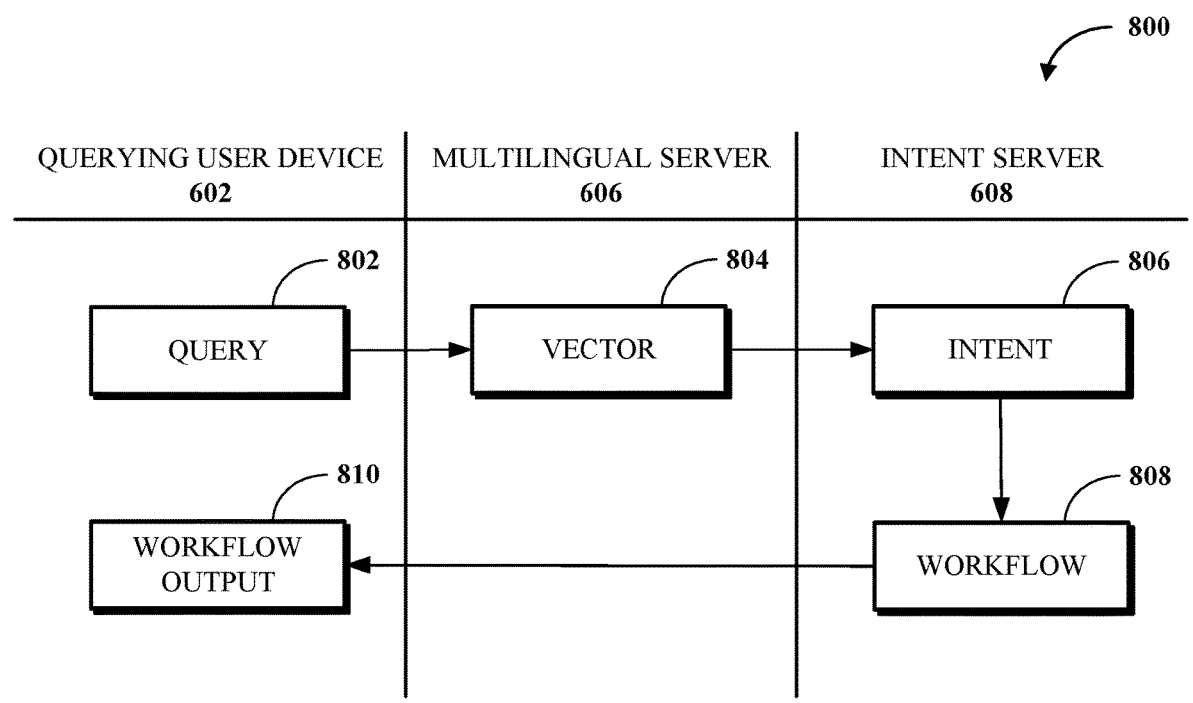
FIG. 8 is a data flow diagram of an example of multilingual intent matching and workflow processing.

FIG. 8 is a data flow diagram of an example of multilingual intent matching and workflow processing 800. As shown, the multilingual intent matching and workflow processing 800 is implemented using the querying user device 602, the multilingual server 606, and the intent server 608 described in conjunction with FIG. 6.

As shown in FIG. 8, the querying user device 602 generates a query 802 in a natural language (e.g., as described in conjunction with FIG. 7) and transmits the query 802 to the multilingual server 606. The query 802 may be in one of multiple natural languages that are capable of being processed by the multilingual server 606. The multilingual server 606 leverages word embeddings in one or more of the multiple natural languages to map the query 802 to a vector 804 representing the meaning of the query. It should be noted that the multilingual server 606 may be able to process a query in a single language or a combination of languages. For example, the queries "I want coffee," (English) "Yo quiero café," (Spanish) and "Yo quiero coffee," (combination of Spanish and English) may all map to the same vector, as all three queries have the same meaning. As a result, the multilingual server 606 may be able to process a query by a child (or other person) who combines words in multiple languages, for example, due to the child's parents speaking to the child in different languages. The multilingual server 606 may also be able to process queries by a student of a language who does not know certain words in the language and replaces those words with words in their native language. For example, "Yo quiero coffee," may be spoken by a native speaker of English who is a student of Spanish and knows the phrase "yo quiero," but does not know the Spanish word for coffee.

After identifying the vector 804, the multilingual server 606 provides the vector 804 to the intent server 608. The intent server 608 matches the vector 804 (representing the meaning of the query 802) an intent 806. The intent 806 may be identified by applying deep learning or other machine learning software to the vector 804. For example, the vector 804 corresponding to the query "I want coffee," (or the other queries above with the same meaning) may match to the intent "order coffee."

The intent server 608 identifies a workflow 808 corresponding to the intent 806. The workflow 706 may include at least one workflow output 810 that is to be provided to the querying user device. For example, if the querying user device 602 is a tablet computer on a table of a restaurant the workflow may include a prompt for entry of payment information, a verification that the payment information is valid, and a visual output indicating that the ordered items (e.g., coffee) are to be brought to the table soon. The intent server 608 transmits the workflow output 810 based on the workflow 808 to the querying user device 602 for visual and/or auditory output thereat.

In one example use case, a user of a telephone calls a supermarket. Upon connection of the telephone call, an automated agent of the supermarket asks the user to, "Please state the reason for your call." The user says, "¿A qué hora cierra la tienda?" which translates from Spanish into English to "At what time does the store close?" in Spanish. This phrase is stored, at a server of the supermarket, as the query. The query is transmitted to the multilingual server 606, which maps the query onto a numeric vector representing the meaning of the query. The vector is transmitted to an intent server, which identifies (e.g., using machine learning) an intent corresponding to the vector. For example, the intent may be "verify store hours." A server of the supermarket (e.g., the intent server or another server) generates an output to provide to the telephone of the user based on the intent. For example, the output may be the automated agent playing the phrase, "The supermarket is open daily from 8:00 until 21:00." In some implementations the automated agent may play a translation of the phrase into the natural language of the query. Thus, a translation of this phrase into Spanish may be played instead of the English version above.

Figure 9:
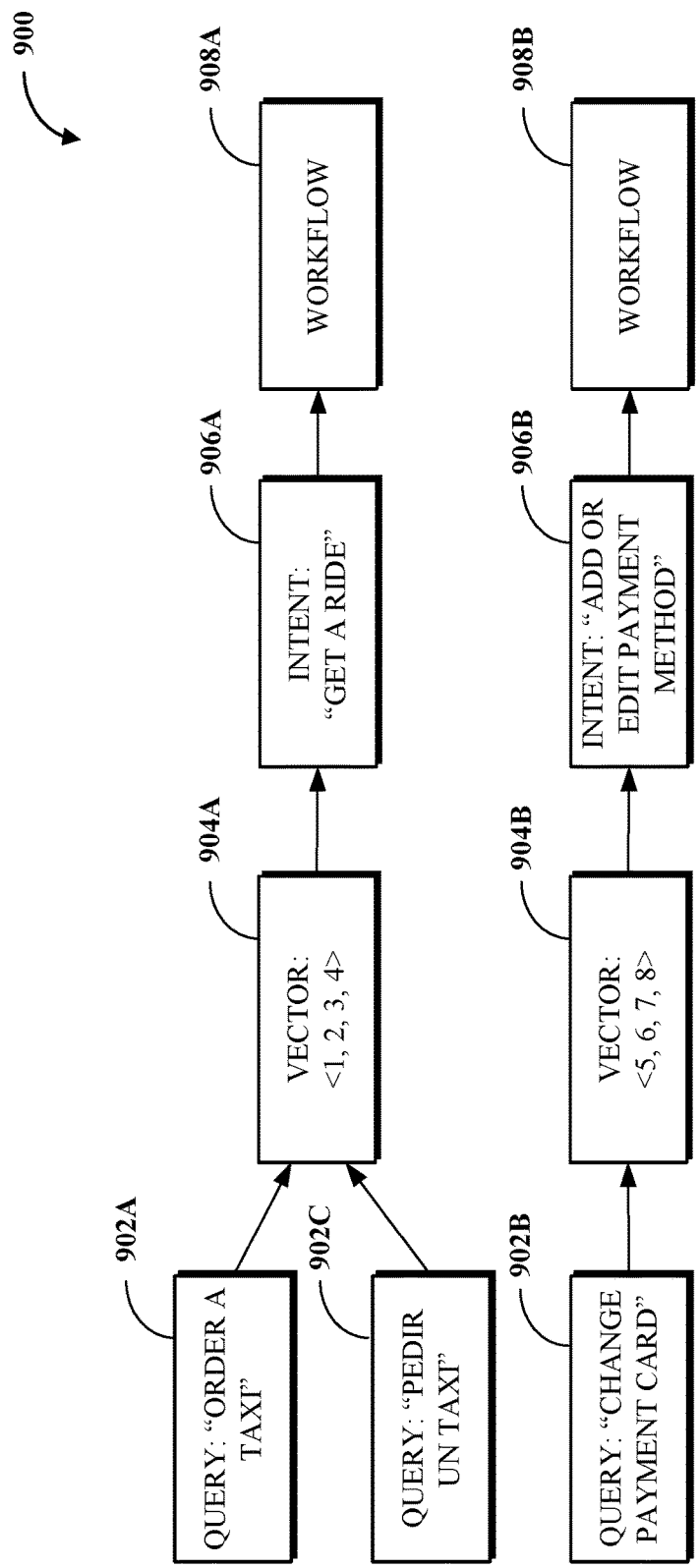
FIG. 9 is a flow diagram of an example of identifying workflows for multilingual queries.

FIG. 9 is a flow diagram of an example of identifying workflows for multilingual queries 900. As shown, the flow diagram illustrates the processing of three queries: query 902A—"order a taxi," query 902B—"change payment card," and query 902C—"pedir un taxi." It should be noted that query 902C corresponds to query 902A in Spanish. The queries 902A, 902B, 902C may be received at a contact center (e.g., the contact center 400) of a taxi or ride sharing service operator, for example, by telephone or via an online chat, voice calling, or video calling service. The contact center may include at least one of the server 504, the multilingual server 606, or the intent server 608. The queries 902A, 902B, 902C may be text queries that are obtained based on a user of a client device typing the queries 902A, 902B, 902C. Alternatively, the user may speak the queries 902A, 902B, 902C, and speech-to-text technology may be used to convert the queries 902A, 902B, 902C to text.

The query 902A is mapped (e.g., using the query-to-vector engine 610) to a numeric vector 904A that represents the meaning of the query 902A based on word embeddings of the query 902A. Similarly, the query 902B is mapped to a numeric vector 904B based on word embeddings of the query 902B. The query 902C is mapped to the numeric vector 904A based on word embeddings of the query 902C. It should be noted that both the query 902A and the query 902C are mapped to the same numeric vector 904A because the meaning of the query 902A is the same as the meaning of the query 902C. Each numeric vector 904A, 904B may represent a coordinate in a multi-dimensional space.

The numeric vector 904A (associated with the query 902A and the query 902C) is matched (e.g., using the vector-to-intent engine 612) to an intent 906A—"get a ride." Similarly, the vector 904B (associated with the query 904A) is matched to an intent 906B—"add or edit payment method." Each numeric vector may be matched to an intent from a set of intents using artificial intelligence technology. According to some examples, the artificial intelligence technology computes a probability that a given numeric vector corresponds to each intent from the set of intents. The given numeric vector is assigned to the intent with the highest probability if that probability exceeds a preset threshold (e.g., 0.9 or 0.85). If the probability does not exceed the threshold, the query is not assigned to an intent and another processing technique (e.g., assigning to a human customer service agent or asking the user to repeat or rephrase the query) may be used.

After the intent 906A, 906B is identified, a workflow 908A, 908B is selected based on the intent, with the workflow 908A corresponding to the intent 906A and the workflow 908B corresponding to the intent 906A. In some examples, the workflow 908A for the intent 906A ("get a ride") includes: transmitting, to the querying user device, a prompt to specify a geographic location from which the ride is requested; dispatching a vehicle to the geographic location; and transmitting, to the querying user device, a notification that the vehicle has been dispatched. The workflow 908B for the intent 908A ("add or edit payment method") includes providing a link to a website that includes an article instructing the user how to log in to their account and edit the stored payment methods or add a new payment method. The payment method may include at least one of a credit card, a debit card, a bank account, or a gift card.

Figure 10:
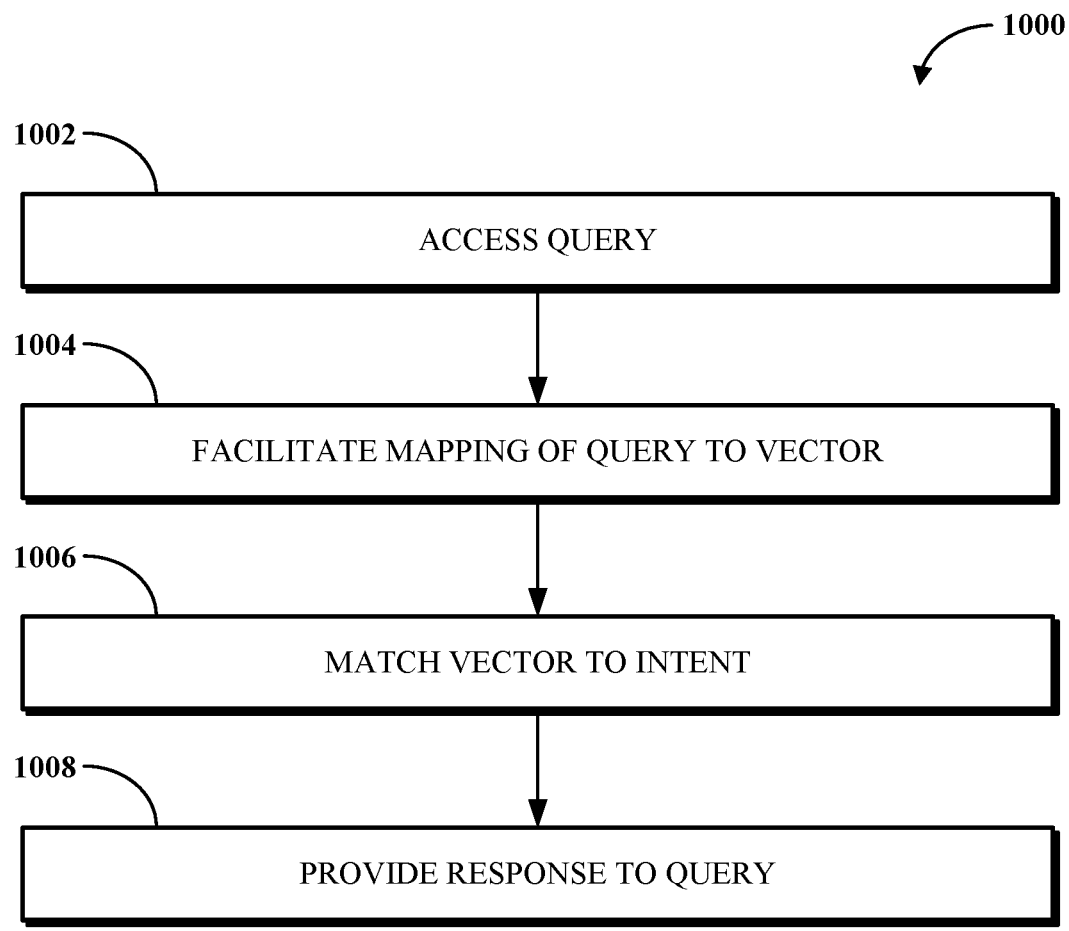
FIG. 10 is a flowchart of an example of a technique for multilingual intent matching.

To further describe some implementations in greater detail, reference is next made to examples of techniques for intent matching. FIG. 10 is a flowchart of an example of a technique for multilingual intent matching. The technique 1000 can be executed using computing devices, such as the systems, hardware, and software described with respect to FIGS. 1-9. The technique 1000 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof.

For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1002, an intent server (e.g., the intent server 608) of a contact center (e.g., the contact center 400) accesses a natural language query corresponding to one of a plurality of natural languages. The natural language query may be received from a client device operated by a user accessing the contact center via a telephone number, a webpage, or special purpose application. For example, the natural language query may be in one of the natural languages that a multilingual server (e.g., the multilingual server 606) configured to convert queries to vectors is configured to handle. (The intent server may forward the query to the multilingual server for processing at the multilingual server, as described below.) The multilingual server may be external to the contact center and may be operated by a different entity than the contact center. Alternatively, the multilingual server may be a component of the contact center. In some implementations, a single machine performs the functions of both the multilingual server and the intent server.

At 1004, the intent server facilitates a mapping of the natural language query to a vector. In some cases, the intent server transmits the natural language query to the multilingual server, which maps the query to the vector. The multilingual server uses a query-to-vector engine (e.g., the query-to-vector engine 610) configured to leverage word embeddings in each of the plurality of natural languages to map natural language queries in the plurality of natural languages to vectors corresponding to meanings of the natural language queries. After mapping the query to the vector, the multilingual server transmits the vector to the intent server. In some cases, the multilingual server does not translate the natural language query into a natural language different from an original natural language of the natural language query (e.g., the language in which the query was typed or spoken). It should be noted that the vector is not a natural language because the vector is not in a spoken or written language that has developed and evolved naturally by human use thereof. Alternatively, a single machine (or a single set of machines) may perform the functionalities of both the intent server and the multilingual server.

At 1006, the intent server matches the vector to an intent representing a prediction associated with the natural language query. The matching may be done using at least one of a statistical technique, a machine learning technique, or an artificial intelligence technique. (In one example, an administrator of the contact center manually generates a set of intents. A set of queries provided by users is manually matched to queries by the administrator (or team of administrators) to generate a training dataset. Supervised learning techniques are applied to train a CNN to match queries to intents based on the training dataset.) The intent may represent a grouping of a set of queries (including the natural language query accessed at 1002) for common processing. For example, at a contact center of a restaurant, all delivery orders may be processed using a common technique for processing deliveries. Similarly, all reservation requests may be processed using a common technique for making reservations. Thus, the contact center of the restaurant may include an intent titled "order delivery" and an intent titled "make reservation."

At 1008, the intent server provides (e.g., to a user device that transmitted the natural language query or otherwise from which the natural language query originated) a response to the natural language query based on the intent. Each intent corresponds to a workflow for processing the intent. The response may be based on the workflow, for example, a first user prompt or a first user output in the workflow.

The technology is described above in the context of a contact center. However, the technology may be implemented in other contexts where intent determination is useful. For example, a personal digital assistant embodied in a standalone device (e.g., Alexa® by Amazon, Inc. of Seattle, Washington) or within another computing device (e.g., Siri® which is implemented in some mobile phones and tablet computers manufactured by Apple Corporation of Cupertino, California) may determine an intent associated with a spoken (or typed) query using the techniques described herein. Similarly, a search engine may determine an intent associated with a search query using the techniques described herein. For example, the phrase "What is the weather?" (English) or "¿Cuál es el clima?" (Spanish) spoken to a personal digital assistant or typed into a search engine may correspond to an intent "output weather forecast."

In one example use case, a user activates a personal digital assistant on a mobile phone and says, "Llama a mi madre," which means "Call my mother" in Spanish. The mobile phone identifies "Llama a mi madre," as the query. The query is transmitted to a query-to-vector engine (e.g., at a server) which maps the query to a numeric vector corresponding to the meaning of the query. The vector is transmitted to an intent matching engine (e.g., at the same server or a different server) which determines that the intent is "make a telephone call." Based on the intent and the query, the mobile phone (or a server connected to the mobile phone over a network) attempts to determine who is to be telephoned. A natural language processing engine (e.g., residing at the mobile phone or at a server) may determine, based on the query that a contact associated with the name "madre," "mama," "mother," or "mom" is to be telephoned. After identifying the intent ("make a telephone call") and a telephone number of the recipient, the mobile phone places the telephone call.

In another example use case, a client device accesses a webpage of a search engine and the user of the client device types, "¿Cuál es el precio de las acciones de ABC Corporation?" ("What is the stock price of ABC Corporation?" in Spanish) into the search box on the webpage. A server of the search engine identifies this phrase as the query. The query is transmitted to a query-to-vector engine of the search engine, which computes a vector representing a coordinate in a multiple dimensional space that corresponds to the meaning of the query. The vector is provided to an intent matching engine of the search engine. The intent matching engine identifies "get stock quote" as the intent. Based on the intent and the query, the server of the search engine attempts to determine for which company to get a stock quote. Using natural language processing techniques, the server identifies the company as ABC Corporation. The server then looks up the stock price of ABC Corporation and outputs the stock price to the client device. The above example is described as a user accessing a webpage of the search engine. However, it should be noted that this technique can be adapted to a user calling a phone number associated with the search engine or sending a short messaging service (SMS) message (or a message in another protocol) to a messaging address associated with the search engine.

Some implementations are described below as numbered examples (Example 1, 2, 3, etc.). These examples are provided as examples only and do not limit the other implementations disclosed herein.

Example 1 is a method, comprising: accessing a natural language query corresponding to one of a plurality of natural languages; facilitating a mapping of the natural language query to a vector using a query-to-vector engine configured to leverage word embeddings in each of the plurality of natural languages to map natural language queries in the plurality of natural languages to vectors corresponding to meanings of the natural language queries; matching the vector to an intent representing a prediction associated with the natural language query; and providing a response to the natural language query based on the intent.

In Example 2, the subject matter of Example 1 includes, testing the query-to-vector engine and a vector-to-intent engine used to match the vector to the intent by verifying that a first query in a first natural language and a translation of the first query into a second natural language match to a same intent.

In Example 3, the subject matter of Examples 1-2 includes, wherein the vector is matched to an intent using a vector-to-intent engine, the method comprising: training the vector-to-intent engine by locking the word embeddings and using supervised learning with a dataset comprising a set of queries and intents matched to queries in the set.

In Example 4, the subject matter of Examples 1-3 includes, wherein the intent represents a grouping of a set of queries, including the natural language query, for further processing.

In Example 5, the subject matter of Examples 1-4 includes, wherein the vector is a numeric vector in a multi-dimensional space.

In Example 6, the subject matter of Examples 1-5 includes, wherein facilitating the mapping of the natural language query to the vector does not include translating the natural language query into a natural language different from a natural language of the natural language query.

In Example 7, the subject matter of Examples 1-6 includes, wherein the vector is matched to the intent using a machine learning technique.

Example 8 is a computer readable medium storing instructions operable to cause one or more processors to perform operations comprising: accessing a natural language query corresponding to one of a plurality of natural languages; facilitating a mapping of the natural language query to a vector using a query-to-vector engine configured to leverage word embeddings in each of the plurality of natural languages to map natural language queries in the plurality of natural languages to vectors corresponding to meanings of the natural language queries; matching the vector to an intent representing a prediction associated with the natural language query; and providing a response to the natural language query based on the intent.

In Example 9, the subject matter of Example 8 includes, the operations comprising: testing the query-to-vector engine and a machine learning engine used to match the vector to the intent by verifying that a first query in a first natural language and a translation of the first query into a second natural language match to a same intent.

In Example 10, the subject matter of Examples 8-9 includes, wherein the vector is matched to an intent using a machine learning engine, the operations comprising: training the machine learning engine by locking the word embeddings and using supervised learning with a dataset comprising a set of queries and intents matched to queries in the set.

In Example 11, the subject matter of Examples 8-10 includes, wherein the intent represents a grouping of a set of queries, including the natural language query, for further processing using a specified technique from a set of techniques.

In Example 12, the subject matter of Examples 8-11 includes, wherein the vector represents a coordinate within a multi-dimensional space.

In Example 13, the subject matter of Examples 8-12 includes, wherein facilitating the mapping of the natural language query to the vector does not include machine translation of the natural language query.

In Example 14, the subject matter of Examples 1-13 includes, wherein the vector is matched to the intent using a statistical technique.

Example 15 is an apparatus comprising: a memory; and a processor configured to execute instructions stored in the memory to: access a natural language query corresponding to one of a plurality of natural languages; facilitate a mapping of the natural language query to a vector using a query-to-vector engine configured to leverage word embeddings in each of the plurality of natural languages to map natural language queries in the plurality of natural languages to vectors corresponding to meanings of the natural language queries; match the vector to an intent representing a prediction associated with the natural language query; and provide a response to the natural language query based on the intent.

In Example 16, the subject matter of Example 15 includes, the processor configured to execute the instructions stored in the memory to: test the query-to-vector engine and an artificial intelligence engine used to match the vector to the intent by verifying that a first query in a first natural language and a translation of the first query into a second natural language match to a same intent.

In Example 17, the subject matter of Examples 15-16 includes, wherein the vector is matched to an intent using an artificial intelligence engine, the processor configured to execute the instructions stored in the memory to: train the artificial intelligence engine by locking the word embeddings and using supervised learning with a dataset comprising a set of queries and intents matched to queries in the set.

In Example 18, the subject matter of Examples 15-17 includes, wherein the intent represents a grouping of a set of queries, including the natural language query, for further computer-implemented processing using a specified technique.

In Example 19, the subject matter of Examples 15-18 includes, wherein facilitating the mapping of the natural language query to the vector does not include machine translation.

In Example 20, the subject matter of Examples 15-19 includes, wherein the vector is matched to the intent using an artificial intelligence technique.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   accessing a natural language query;
   facilitating a mapping of the natural language query to a vector using a query-to-vector engine;
   matching, using a vector-to-intent engine, the vector to an intent representing a prediction associated with the natural language query, the vector-to-intent engine being trained by locking word embeddings and using a learning engine with a training dataset comprising a set of queries and intents matched to queries in the set; and
   providing a response to the natural language query based on the intent.

2. The method of claim 1, comprising:
   testing the query-to-vector engine and the vector-to-intent engine—by verifying that a first query in a first natural language matches to a same intent as a translation of the first query into a second natural language.

3. The method of claim 1, wherein the query-to-vector engine is configured to leverage the word embeddings in each of a plurality of natural languages to map natural language queries in the plurality of natural languages to vectors corresponding to meanings of the natural language queries.

4. The method of claim 1, wherein the intent represents a grouping of a set of queries, including the natural language query, for further processing.

5. The method of claim 1, wherein the vector is a numeric vector in a multi-dimensional space.

6. The method of claim 1, wherein facilitating the mapping of the natural language query to the vector does not include translating the natural language query into a natural language different from a natural language of the natural language query.

7. The method of claim 1, wherein the vector is matched to the intent using a machine learning technique.

8. Non-transitory computer readable media storing instructions operable to cause one or more processors to perform operations comprising:
   accessing a natural language query;
   facilitating a mapping of the natural language query to a vector using a query-to-vector engine;
   matching, using a vector-to-intent engine, the vector to an intent representing a prediction associated with the natural language query, the vector-to-intent engine being trained by locking word embeddings and using a learning engine with a training dataset comprising a set of queries and intents matched to queries in the set; and providing a response to the natural language query based on the intent.

9. The computer readable media of claim 8, the operations comprising:

testing the query-to-vector engine and the vector-to-intent engine by verifying that a first query in a first natural language matches to a same intent as a translation of the first query into a second natural language.

10. The computer readable media of claim 8, wherein the query-to-vector engine is configured to leverage the word embeddings in each of a plurality of natural languages to map natural language queries in the plurality of natural languages to vectors corresponding to meanings of the natural language queries.

11. The computer readable media of claim 8, wherein the intent represents a grouping of a set of queries, including the natural language query, for further processing.

12. The computer readable media of claim 8, wherein the vector is a numeric vector in a multi-dimensional space.

13. The computer readable media of claim 8, wherein facilitating the mapping of the natural language query to the vector does not include translating the natural language query into a natural language different from a natural language of the natural language query.

14. The computer readable media of claim 8, wherein the vector is matched to the intent using a machine learning technique.

15. A system comprising:

memory hardware; and one or more processors configured to execute instructions stored in the memory hardware to:

access a natural language query;

facilitate a mapping of the natural language query to a vector using a query-to-vector engine;

match, using a vector-to-intent engine, the vector to an intent representing a prediction associated with the natural language query, the vector-to-intent engine being trained by locking word embeddings and using a learning engine with a training dataset comprising a set of queries and intents matched to queries in the set; and provide a response to the natural language query based on the intent.

16. The system of claim 15, the one or more processors configured to execute the instructions stored in the memory hardware to:

testing the query-to-vector engine and the vector-to-intent engine by verifying that a first query in a first natural language matches to a same intent as a translation of the first query into a second natural language.

17. The system of claim 15, wherein the query-to-vector engine is configured to leverage the word embeddings in each of a plurality of natural languages to map natural language queries in the plurality of natural languages to vectors corresponding to meanings of the natural language queries.

18. The system of claim 15, wherein the intent represents a grouping of a set of queries, including the natural language query, for further processing.

19. The system of claim 15, wherein the vector is a numeric vector in a multi-dimensional space.

20. The system of claim 15, wherein facilitating the mapping of the natural language query to the vector does not include translating the natural language query into a natural language different from a natural language of the natural language query.

* * * * *